(12) United States Patent
Mimken

(10) Patent No.: US 7,566,850 B2
(45) Date of Patent: Jul. 28, 2009

(54) METHOD OF HOT WIRE WELDING OF PLASTICS

(75) Inventor: Victor Mimken, Boise, ID (US)

(73) Assignee: Applied Materials, Inc., Santa Clara, CA (US)

( * ) Notice: Subject to any disclaimer, the term of this patent is extended or adjusted under 35 U.S.C. 154(b) by 140 days.

(21) Appl. No.: 11/460,117

(22) Filed: Jul. 26, 2006

(65) Prior Publication Data

US 2007/0034623 A1     Feb. 15, 2007

Related U.S. Application Data

(60) Provisional application No. 60/703,261, filed on Jul. 27, 2005.

(51) Int. Cl.
*B23K 13/01* (2006.01)
*B44C 1/22* (2006.01)

(52) U.S. Cl. ...................... 219/612; 216/62.6

(58) Field of Classification Search ........................ None
See application file for complete search history.

(56) References Cited

U.S. PATENT DOCUMENTS

| | | | |
|---|---|---|---|
| 4,789,498 A | 12/1988 | Boultinghouse | |
| 5,091,038 A | 2/1992 | Greller et al. | |
| 5,160,466 A * | 11/1992 | Allan et al. | 264/69 |
| 5,486,684 A * | 1/1996 | Peterson et al. | 219/633 |
| 5,705,795 A * | 1/1998 | Anderson et al. | 219/633 |
| 5,717,191 A * | 2/1998 | Christensen et al. | 219/634 |
| 5,968,442 A | 10/1999 | Sato et al. | |
| 6,283,810 B1 | 9/2001 | Evans | |
| 6,392,208 B1 | 5/2002 | Arx | |
| 6,514,063 B2 | 2/2003 | Acciai et al. | |
| 6,660,942 B2 | 12/2003 | Horiuchi et al. | |
| 6,723,956 B2 | 4/2004 | Briand et al. | |
| 6,776,949 B2 | 8/2004 | Weber | |
| 6,916,393 B2 | 7/2005 | Ohzuru et al. | |
| 6,976,770 B2 | 12/2005 | Trimpe et al. | |
| 7,008,985 B1 | 3/2006 | Green | |
| 2005/0191098 A1 | 9/2005 | Ueno et al. | |
| 2006/0029411 A1 | 2/2006 | Ishii et al. | |

FOREIGN PATENT DOCUMENTS

| | | |
|---|---|---|
| EP | 1 097 797 B1 | 2/2004 |
| JP | 10-161445 | 6/1998 |
| JP | 2005-70376 | 3/2005 |

OTHER PUBLICATIONS

PCT International Search Report and Written Opinion for PCT/US06/28992, dated Feb. 21, 2007.
US 6,389,184, 02/1995, Jacaruso et al. (withdrawn)

* cited by examiner

*Primary Examiner*—Daniel L Robinson
(74) *Attorney, Agent, or Firm*—Patterson & Sheridan, LLP

(57) ABSTRACT

A method and apparatus for welding polymer components by forming a groove along a surface of a polymer part to be welded, placing a conductive member in the groove, heating the conductive member to a first temperature for a first period, allowing the parts to cool for a second period to form a weldment, heating the conductive member to a second temperature for a third period, and removing the conductive member from the weldment.

4 Claims, 7 Drawing Sheets

METHOD OF HOT WIRE WELDING OF PLASTICS

CROSS-REFERENCE TO RELATED APPLICATIONS

This application claims benefit of U.S. Provisional Patent Application No. 60/703,261, filed Jul. 27, 2005, which is incorporated by reference herein.

BACKGROUND OF THE INVENTION

1. Field of the Invention

This application relates to manufacturing products and components from polymer materials. More specifically, this application provides a method and apparatus for joining polymers. More particularly, this application relates to fabricating a processing chamber for use in semiconductor fabrication.

2. Description of the Related Art

Many devices and products are manufactured from polymers. In the manufacture of a polymer product, the product, or a component of the product, is typically formed by molding, extrusion, machining, or other forming process. Generally, the material used is a solid at a predetermined temperature, which may be at or near room temperature, but is capable of transition to an interphase state between a liquid and a solid when heated. The material may be capable of being heated to a viscous or semi-viscous state and returning to a non-viscous state without significant degradation. Thus, the material may be capable of processing by heat application to at least a portion of the material and, after cooling, the material returns to a more solidified state.

Polymer components may be joined together to make the product or subassembly. Conventional joining includes solvent bonding, adhesive bonding, fastening, and various techniques generally referred to as plastic welding. Plastic welding typically includes applying heat, and in some applications, pressure, to at least a portion of the interface of two or more polymer components. The heat may be produced by heated fluids applied to the interface, friction, high-frequency electromagnetic waves, high-frequency sound waves, laser, convection, or other suitable application. In some of these processes, a filler material may be added during the heat application to fill gaps or form a weld bead.

Although there are numerous joining methods available, some product applications may not be capable of joining by conventional methods. For instance, some materials may be resistant to adhesives and solvents, and some of the conventional methods may also promote oxidation and/or particle generation, which may be detrimental in product applications where purity of the material must be maintained. The conventional methods may also distort the product due to uneven or excessive heat application. Further, some of the conventional methods require line of sight application and/or are difficult to use with interfaces having small dimensions, which may require the manufacturer to alter the product in order to join its components. Also, it may be desirable to join the components where a weld or joint is internal to the finished product, which may be difficult or impossible to accomplish with the conventional methods.

Another joining method has been developed and uses electrical resistance, sometimes known as resistive implant welding, electrical-resistance fusion, or electro-fusion. A conductive insert, such as a wire or metal mesh, is positioned at the interface of the components to be joined. The insert and subsequently the surrounding material are heated up by the resistive effect of electric current applied to the insert. Upon reaching a viscid or semi-viscid state, the two surfaces are joined and the insert remains in place with no further use. However, there are product applications where the remaining insert may be problematic. For instance, the insert may react magnetically and/or electrically when the product is in operation, which may be detrimental to the product and/or the process performed within the product.

The present application minimizes or solves the problems mentioned above by providing a method and apparatus to join two or more polymer components together. The method is useful, for example, for forming a chamber for use in processing a semiconductor substrate.

SUMMARY OF THE INVENTION

The present invention generally provides a method and apparatus for constructing a chamber by forming a groove in one part adjacent another part and placing a wire in the groove, heating the wire to a first temperature to weld the parts, allowing the parts to cool, heating the wire to a second temperature great enough to melt the adjacent material, and removing the wire from the parts.

In another embodiment, a method of joining a first part and a second part, the parts comprising a polymer material, is described. The method includes providing a first part having a surface including a groove, aligning the surface of the first part and a surface of the second part, placing a conductive member in the groove, and joining the first part and the second part along the aligned surfaces.

In another embodiment, a method of joining a first part and a second part, the parts comprising a polymer material, is described. The method includes aligning a surface of the first part and a surface of the second part, the surfaces having a conductive member disposed therebetween, heating the conductive member to form a weldment between the first part and the second part, and removing the conductive member from the weldment.

In another embodiment, a method of manufacturing a processing chamber, which includes a first part and a second part, is described. The method includes forming a first groove along a surface of the first part or the second part, placing a conductive member in the groove, securing the first part adjacent the second part, heating the conductive member for a first period, allowing the parts to cool for a second period, heating the conductive member for a third period, and removing the conductive member from the parts.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1A:
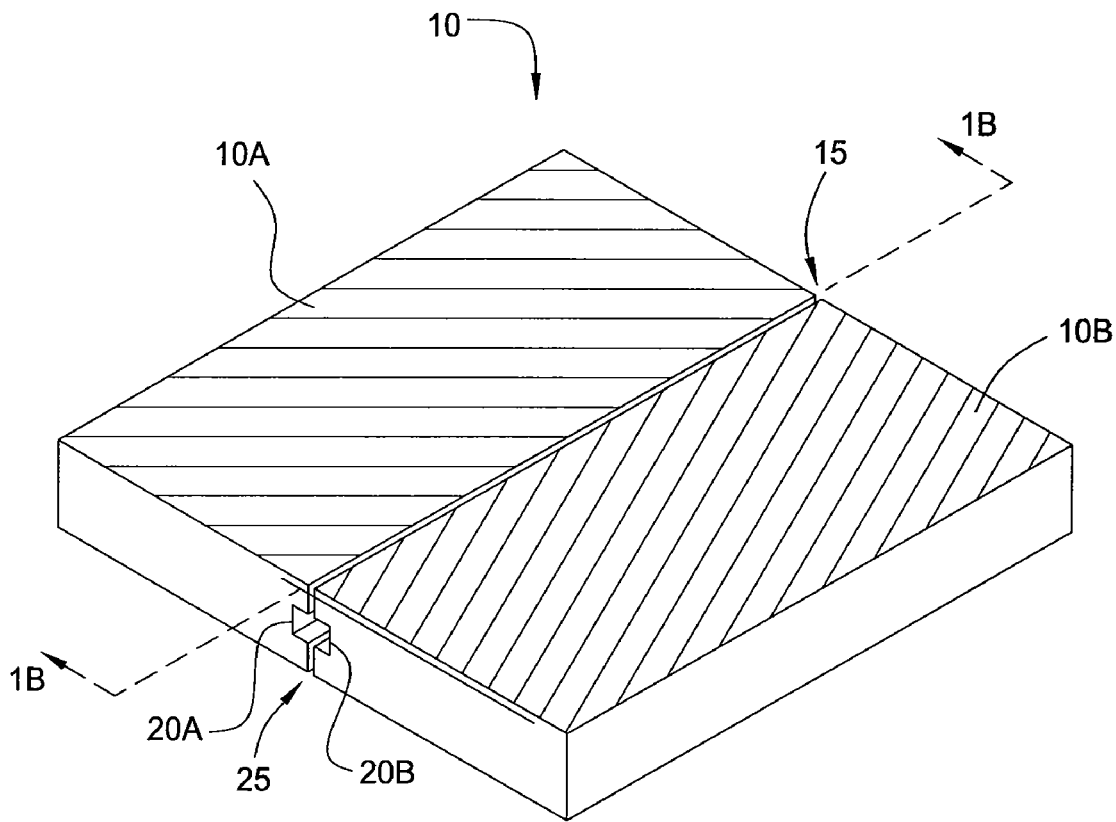
FIG. 1A is an isometric view of one embodiment of an assembly.

FIG. 1A is an isometric view of one embodiment of an assembly 10 having two distinct polymer components, such as part 10A and 10B, which are to be joined to form a product or a portion of a product. Each of the parts 10A and 10B is a solid in a temperature range for an environment that the product is designed for, which may be a temperature at or near room temperature. The parts 10A, 10B, or a portion or portions of the parts 10A, 10B, may be heated to a pre-defined elevated temperature with little or no degradation. As the material cools, the parts 10A, 10B, or portion or portions of the parts 10A, 10B, returns to a solid state. Examples of materials of the parts 10A, 10B are polymers, such as thermoplastics, elastomers, and derivatives thereof.

Parts 10A, 10B may be any polymer capable of being joined by the application of heat, such as polyvinylchloride (PVC), perfluoroalkoxy polymer resin (PFA), fluorinated ethylene-propylene (FEP), ethylene tetrafluoroethylene (ETFE), ethylene chlorotrifluoroethlyene (ECTFE), polyvinylidine difluoride or polyvinylidene flouride (PVDF), trifluoroethanol (TFE), or derivatives thereof, among others. In one embodiment, the parts 10A, 10B are made of the same material, but the parts 10A, 10B may be different materials depending on the specific physical properties of the materials used for part 10A and 10B, such as the ability of the parts to join or bond upon application of heat.

The parts 10A, 10B of the assembly 10 are positioned to have one side of each of the parts adjacent each other to form an interface 15 therebetween, which may be generally referred to as a butt joint as shown in FIG. 1. It is also contemplated that other joint configurations may be utilized. The interface 15 also includes grooves 20A, 20B formed in a respective surface of the parts 10A, 10B. The grooves 20A, 20B form a channel 25 in the interface 15 when the parts 10A, 10B are positioned adjacent each other. While the grooves forming the channel 25 are formed in both parts 10A, 10B as shown, the channel 25 may be formed in only one of the parts 10A, 10B.

Figure 1B:
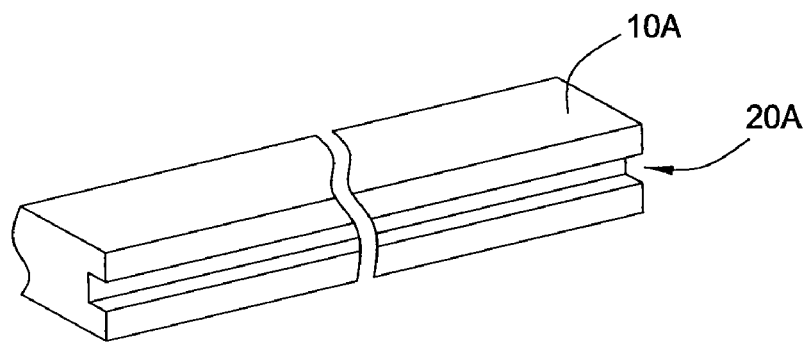
FIG. 1B is a sectional view from section line 1B-1B in FIG. 1A.

FIG. 1B is an isometric sectional view of part 10A taken along section line 1B-1B in FIG. 1A. Groove 20A is formed in a surface of part 10A along a length or width of the part 10A. The part 10A may be extruded, molded, or formed by any suitable process having the groove 20A formed therein. Alternatively, the part 10A may be produced by any known polymer forming process, and the groove 20A formed therein by machining the surface of the part 10A or other groove forming process.

Figure 1C:
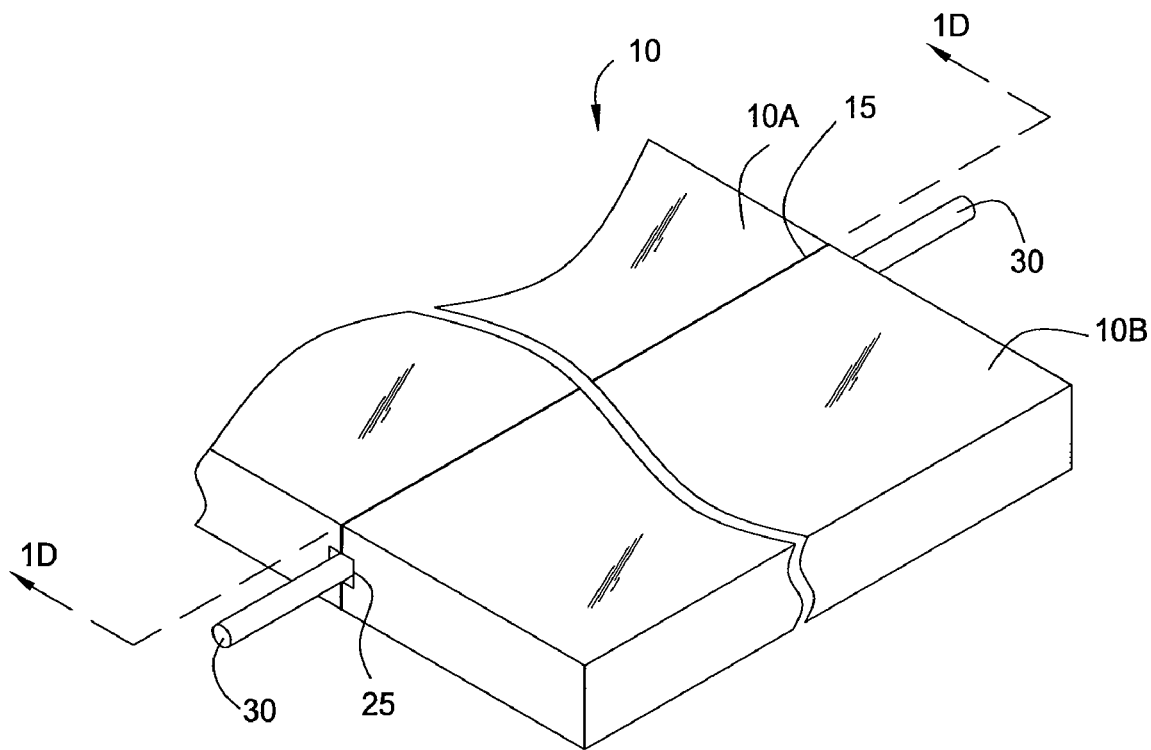
FIG. 1C is an isometric view of another embodiment of an assembly.

FIG. 1C is an isometric view of the assembly 10, which includes parts 10A and 10B positioned adjacent each other at the interface 15. A conductive member 30, such as a rod, is inserted into the channel 25. The conductive member 30 may be inserted into at least one of the grooves 20A, 20B (FIG. 1A) prior to forming interface 15, or the conductive member 30 may be inserted into the channel 25 after the parts are placed adjacent each other. The conductive member 30 may be made of any thermally or electrically conductive material, such as steel, stainless steel, copper, aluminum, titanium, gold, silver, or any other thermally and/or electrically conductive material. Oxides and/or other contaminants on the conductive member 30 may be removed before joining to prevent or minimize contamination of the weldment. The conductive member 30 may have a cross-section that is substantially circular as shown, or the conductive member may be substantially rectangular, triangular, or any other shape configured to be received in at least one groove or the channel 25. In some embodiments, the conductive member 30 may be larger than grooves 20A, 20B, and/or channel 25, wherein the conductive member 30 is adapted to melt polymer portions adjacent the groove and/or channel during application of heat and pressure. Examples of the conductive member 30 include wire, square stock, cable, or the like. The conductive member 30 may be rigid, semi-rigid, or flexible before, during, and after application of heat. In one embodiment, the conductive member 30 may comprise a link-like structure, such as a chain. The rigidness or flexibility of the conductive member 30 may be determined depending upon the parts and interfaces to be joined.

During the joining process, the parts 10A, 10B are secured in any manner to maintain pressure at the interface 15. Securing may be accomplished by clamps coupled to the parts 10A, 10B, or the parts 10A, 10B may be coupled to a workbench. The conductive member 30 is adapted to transfer heat to the parts 10A, 10B forming the channel 25. The heat from the conductive member 30 is transferred to portions of the channel 25 causing the polymer material adjacent the conductive member 30 to reach an interphase state between a solid and a liquid, such as a viscous, a semi-viscous, or a viscid state, thus creating a bond between the parts 10A, 10B, along a substantial portion of the interface 15. In one embodiment, the heat applied to the conductive member 30 is electrically induced, wherein the conductive member 30 is energized and electrical resistance of the conductive member 30 produces heat. In another embodiment, the heat applied to the conductive member 30 may be thermally induced, such as by heating a portion of the conductive member 30 exterior to the assembly 10.

The dimensions and/or shape of the channel 25 may be determined by variables such as material properties, which include thermal conductivity, and thickness of the material to be joined. In one embodiment, the size and/or shape of the conductive member 30 may be selected to substantially mate with, or snugly fit into, the channel 25. In some embodiments, the conductive member 25 is adapted to be adjacent, or touch surfaces of, the channel 25 while positioned therein. In one embodiment, the conductive member 30 is sized to contact a substantial portion or portions of the channel 25 as it is positioned along the length of the channel. Maintaining contact between the conductive member 30 and the channel 25 enhances heat conduction between the conductive member 30 and the parts 10A, 10B, thus enhancing the joining process as the conductive member is heated. The conductive member 30 may be sized to substantially fill the channel 25, which may minimize degradation of the parts 10A, 10B by minimizing the ambient air within the channel 25 during the bonding process. Other methods of minimizing degradation include performing the joining of the parts 10A, 10B in an inert atmosphere, such as by using an evacuable chamber and/or providing an inert gas to the interface 15 during joining.

Figure 1D:
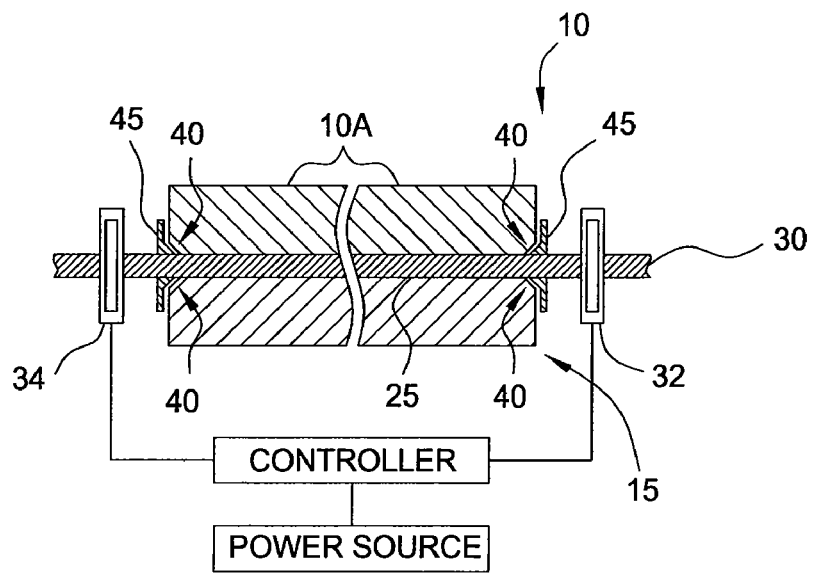
FIG. 1D is a cross-sectional view of the layout from section line 1D-1D of FIG. 1C.

FIG. 1D is a cross-sectional view of the assembly 10 from section line 1D-1D of FIG. 1C. Part 10A is shown having the conductive member 30 positioned therethrough in the channel 25. Connectors 32, 34 are coupled to each end of the conductive member 30. In this embodiment, the connectors 32, 34 are electrical connectors coupled to a power source and a controller. In operation, the power source and controller provide electrical energy to resistively heat the conductive member 30, for a joining process, which may include a welding sequence and a removal sequence.

As shown in FIGS. 1C and 1D, portions of the conductive member that are not in contact with the channel 25 may become overheated as the heat is not uniformly transferred from the conductive member 30 to the interface 15. This overheating may cause damage to the parts 10A, 10B at ends of the interface 15. A heat sink, such as washers 45, may be provided to each end of the conductive member 30 to absorb excess heat from the conductive member 30. The washers 45 may be rectangular, triangular, or annular, each having an aperture configured to slip over the perimeter of the conductive member 30. The washers may be made from a refractory material, such as a ceramic, or may be made of a polymer having a higher resistance to heat, such as a fluoropolymer, for example a Teflon® material. Depending on the material, the washers 45 may be removed from the conductive member 30 after the joining process for re-use with another assembly.

Part 10A also includes a plurality of chamfers 40 at each end of the channel 25, which may also be formed in part 10B (not shown). The chamfers 40 are formed in the ends of channel 25 provide a depressed area adjacent the channel 25. If an inert atmosphere is not used during the joining process as described above, the ends of the channel may slightly deteriorate due to the presence of air. If the ends of the channel do experience deterioration, such as oxidation of the polymer material, the chamfer 40 may be filled by or with a conventional joining method. In one embodiment, the washers 45 are shaped to be adjacent the ends of the channel 25 as shown in FIG. 1D. Regardless of any deterioration of the polymer material adjacent the ends of the channel, the chamfers 40 at each end or the channel 25 may be filled by conventional joining methods after the interface 15 has been joined.

After positioning the conductive member 30 in the interface 15, and securing the parts 10A, 10B, the joining process may be initiated. The joining process generally includes a welding sequence and a removal sequence. The welding sequence is executed during a time period to join parts 10A, 10B, and the removal sequence is executed after the welding sequence, for example, during a time period after a cooling period in order to remove the conductive member 30.

The welding sequence generally comprises a plurality of pulses or on/off cycles provided from the controller, which is in communication with the power source. In one embodiment, the power source is a variable voltage transformer with an AC or DC output. The controller provides a control signal to the power source, which provides current to the conductive member 30. The on/off cycles may be provided during a first welding time period. When the cycle is "on", a first current is provided by the controller, which is operated manually or from a program, for a first time period. The controller then stops the current and the cycle is "off" for a second time period to complete a first welding interval. A second welding interval may be provided after the first and this may repeat during the first welding time period. The first time period is provided to promote a localized heat in the interface 15, thus causing viscidity in the interface. After the welding sequence is completed during the first welding time period, and the parts are allowed to cool to ambient temperature, a substantial portion of the interface 15 is joined and a weldment is provided at the interface 15. For example, the channel and/or the region proximate the channel is replaced by a weldment after the joining process and a sufficient cooling period, which may be any time period that allows the parts 10A, 10B, and specifically the interface 15, to return to a more solidified state. In one embodiment, the cooling period may be complete after the parts 10A, 10B are allowed to cool to at or near ambient temperature, which may be at or near room temperature. The cooling period may be shortened by enhancing the cooling process, such as by circulating cold fluids, using fans, by the use of heat sinks, and the like, on or near the parts 10A, 10B, and/or the interface 15.

After the first time period, a cooling sequence may be initiated while the parts 10A, 10B are held together. The cooling sequence comprises a second welding time period, which is configured to allow the heat from the interface 15 and surrounding portions of the parts 10A, 10B, to dissipate. This cooling promotes re-solidification of the material in the interface 15 and, after this cooling sequence is completed, the parts 10A, 10B are effectively joined and an internal weldment is created at the interface 15.

After the second welding time period, a removal sequence is executed during a third welding time period. The removal sequence includes a plurality of on/off cycles providing current to the conductive member 30. When the cycle is on, a second current is provided by the controller and power source, for a first time period. The controller then stops the current for a second time period. The first time period and the second time period may be repeated for the third welding time period. The third welding time period is typically shorter than the first welding time period, and the second current is typically greater than the first current. The heat from the second current provided to the conductive member 30 promotes intensified heat to the conductive member for a shorter period, thus loosening the bond between the conductive member 30 and the weldment. Once the conductive member 30 is loosened from the parts 10A, 10B, the conductive member 30 may be removed from the weldment.

As the conductive member 30 is removed from the weldment, localized heating of the material adjacent the conductive member becomes viscid. As the conductive member 30 is pulled, a small void may be left in the weldment. However, the dimension or dimensions of the conductive member are configured to leave a small foot print in relation to the weldment. In some instances, this material may become viscous enough to flow into the volume once occupied by the conductive member. In this manner, at least a portion of the weldment is void free, or any void left by the conductive member is negligible, thus creating a substantial weld between the parts 10A, 10B. In one embodiment, the weldment provides a sealing interface at the weldment, thus forming a fluid tight seal on the external surfaces of the parts 10A, 10B at the interface 15.

During removal, the conductive member 30 may be removed from the weldment in any suitable manner. After removal of one or both of the connectors 32, 34, and the washers 45, a pulling pressure or force may be applied to an exposed end of the conductive member 30. The force may be applied manually, such as by pulling the conductive member 30 out of the weldment. The conductive member 30 may also be removed with an actuator, mechanical, electrical, pneumatic, or a combination thereof, with the aid of clamps coupled with the conductive member and the actuator. The actuator may be disposed on a slide table having sensors coupled with a controller to monitor the removal of the conductive member 30. The sensors are adapted to monitor the force exerted on the conductive member 30 relative to the weldment. For example, the actuator may deliver a first pressure to the conductive member 30 to initiate pulling of the conductive member, and after the conductive member 30 has moved a pre-determined distance out of the weldment, the actuator may deliver a second pressure adapted to remove the conductive member 30 from the weldment. The first pressure may be relatively low, and the sensors detect any movement of the conductive member 30 during the pressure application. After a pre-determined amount of movement is detected, the actuator delivers the second pressure to pull the conductive member 30 from the weldment.

Figure 2A:
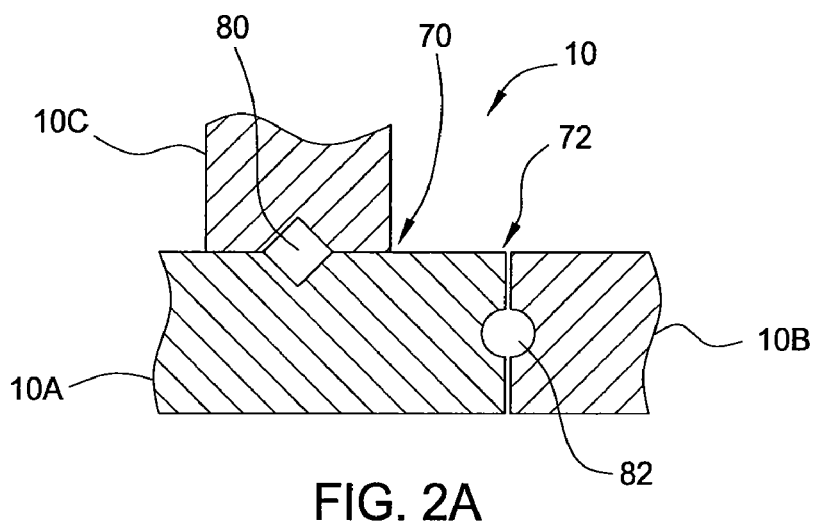
FIG. 2A is a schematic side view of another embodiment of an assembly.

FIG. 2A is a schematic side view of another embodiment of an assembly 10. The assembly 10 includes parts 10A, 10B as shown in other Figures, with the exception of a channel 82 that is circular at interface 72. Part 10C is also added at interface 70, having a channel 80 that is diamond shaped. It is to be noted that the shapes of the channels as shown are not indicative of the cross-sectional shapes of the conductive members 30. For example, a round conductive member 30 may be used in the channel between parts 10A and 10B as well as the channel between 10A and 10C.

Figure 2B:
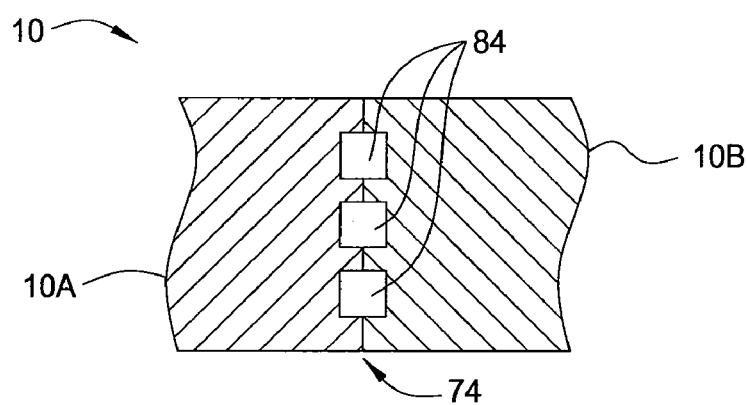
FIG. 2B is a schematic side view of another embodiment of an assembly.

FIG. 2B is a schematic side view of another embodiment of an assembly 10. In this embodiment, multiple channels 84 are provided at the interface 74. In one embodiment, an internal weldment may be provided between the parts 10A, 10B by providing one conductive member 30 to each channel 84, and performing a joining process as described above for each channel 84 separately. In another embodiment, a plurality of conductive members 30 may be provided to each channel 84, and a joining process may be performed at the interface simultaneously. In another embodiment, a select number of channels 84 may be provided with a conductive member 30, and at least one of the channels may be configured to provide a use other than joining the parts 10A, 10B, as described below.

Figure 2C:
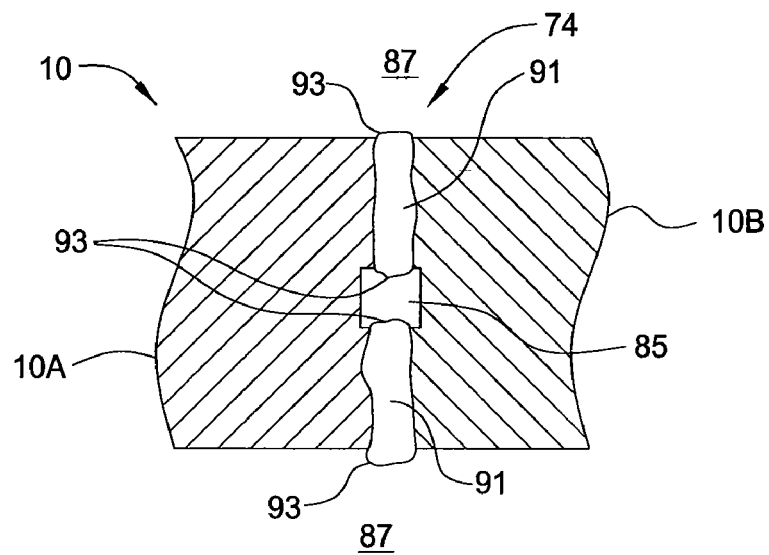
FIG. 2C is a schematic view of another embodiment of the assembly shown in FIG. 2B.

FIG. 2C is a schematic side view of another embodiment of the assembly 10 shown in FIG. 2B. In this embodiment, weldments 91 are provided by the channels 84 (FIG. 2) on opposing sides of the parts 10A, 10B, and the center channel 84 (FIG. 2) is adapted as internal fluid passage 85. In this embodiment, weldments 91 replace the channels 84, leaving internal fluid passage 85 open. In this manner, the parts 10A, 10B may be joined at the interface 74 by weldments 91, and the resulting weldment 91 creates a fluid tight seal between internal fluid passage 85 and external environment 87. In this embodiment, at least the opposing surfaces 93 of weldment 91 provides a sealing interface between environment 87 and internal fluid passage 85. At least the surfaces 93 may be glass-like and substantially smooth to provide a transition surface between parts 10A, 10B that is impermeable to fluids with minimal or no discontinuity between the parts 10A, 10B. Thus, one or both of the weldments 91 and surfaces 93 isolate fluids provided to internal fluid passage 85, and the surfaces 91 eliminate or minimize trapping of any particles that may be present in fluids provided to the internal fluid passage 85 and/or external environment 87.

Figure 2D:
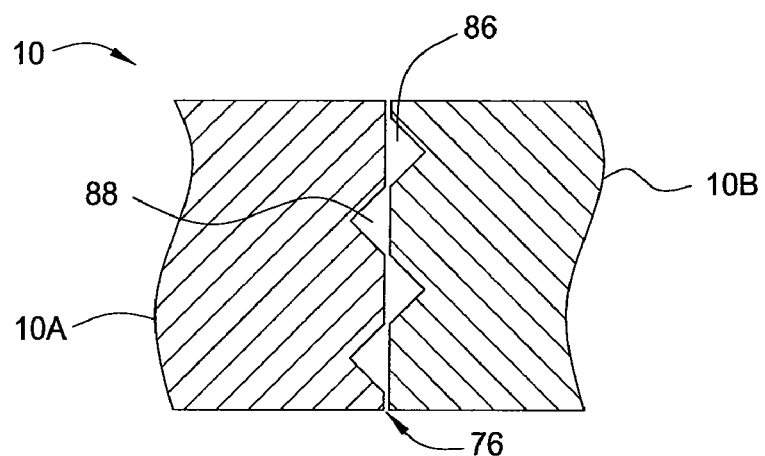
FIG. 2D is a side view of another embodiment of an assembly.

FIG. 2D is a schematic side view of another embodiment of an assembly 10. In this embodiment, channels 86, 88 are triangular and are staggered along the interface 76. The parts 10A, 10B may be joined separately by providing one conductive member at one time to each channels 86, 88, or may be joined simultaneously by providing a plurality of conductive members to the plurality of channels.

Figure 2E:
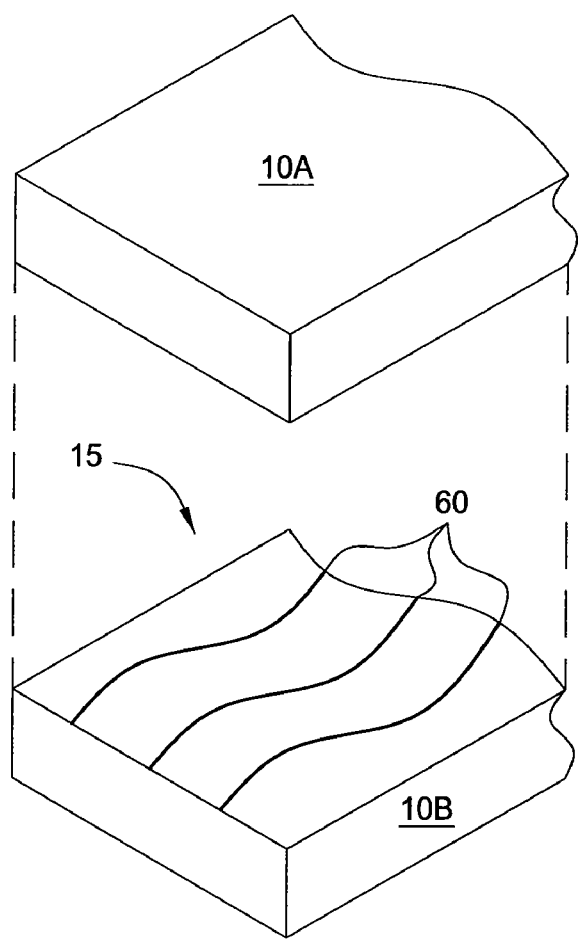
FIG. 2E is an exploded view of another embodiment of an assembly.

FIG. 2E is an exploded view of another embodiment of a layout 10. A plurality of joining lines 60 are shown on part 10B. In this embodiment, the joining lines 60 serve to define the placement of a conductive member 30 (not shown). In one embodiment, each joining line 60 may be formed into channels, such as channels 25 shown in other Figures. Part 10A may also comprise channels that correspond with the channels formed in part 10B. In an alternative embodiment, the joining lines 60 indicate the placement of a conductive member without the use of channels. In this embodiment, a plurality of conductive members are sandwiched between parts 10A, 10B, and the parts are pressed together. The conductive members may be heated and removed as described above to create an internal weldment between parts 10A, 10B. While the joining lines 60 are shown as curvilinear, the joining lines may also be substantially linear.

Figure 3:
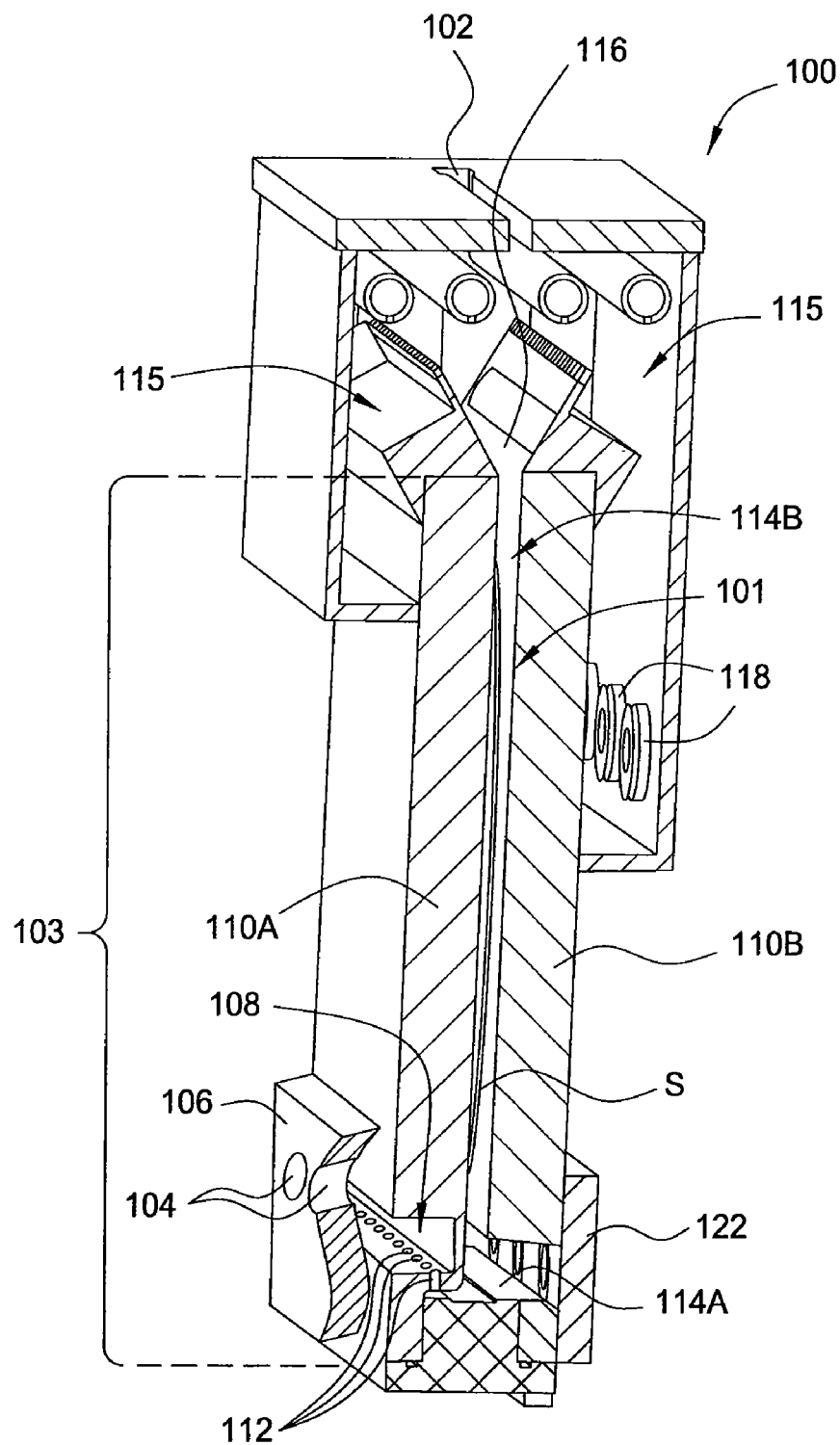
FIG. 3 is an isometric cross-sectional view of one embodiment of a processing tool.

FIG. 3 is an isometric cross-sectional view of a processing tool 100 that may be used to process a substrate S, such as a semiconductor wafer. The processing tool generally includes a chamber 103, which is generally defined by sidewalls 110A, 110B. The chamber 103 also has an interior volume 101. The processing tool 100 may be utilized for cleaning a single substrate S at a time in the chamber 103. The substrate S enters and exits the interior volume 101 through an opening 102 and an aperture 116 via an external robot (not shown).

In operation, the substrate S is provided to the interior volume 101 by the robot, and process fluids are provided to the interior volume by inlets 104 disposed in a cover plate 106. The fluids enter the inlets 104 and travel to a lower portion 114A of the interior volume through a manifold 108. The manifold has a plurality of apertures 112 between the manifold 108 and the lower portion 114A. The fluids flow from the lower portion 114A to an upper portion 114B where the fluids collect in an overflow weir 115 after flowing through the aperture 116 in the upper portion 114B. Fluids collected in the overflow weir 115 are removed from the chamber 103 through overflow outlets 118. Cleaning of the substrate S is enhanced by megasonic energy provided by a plurality of transducers disposed in the interior volume 101. When processing is complete, the substrate S is removed as excess fluids are removed from the interior volume 101 by lower outlets formed in a lower cover 122 adjacent the lower portion 114A.

Figure 4:
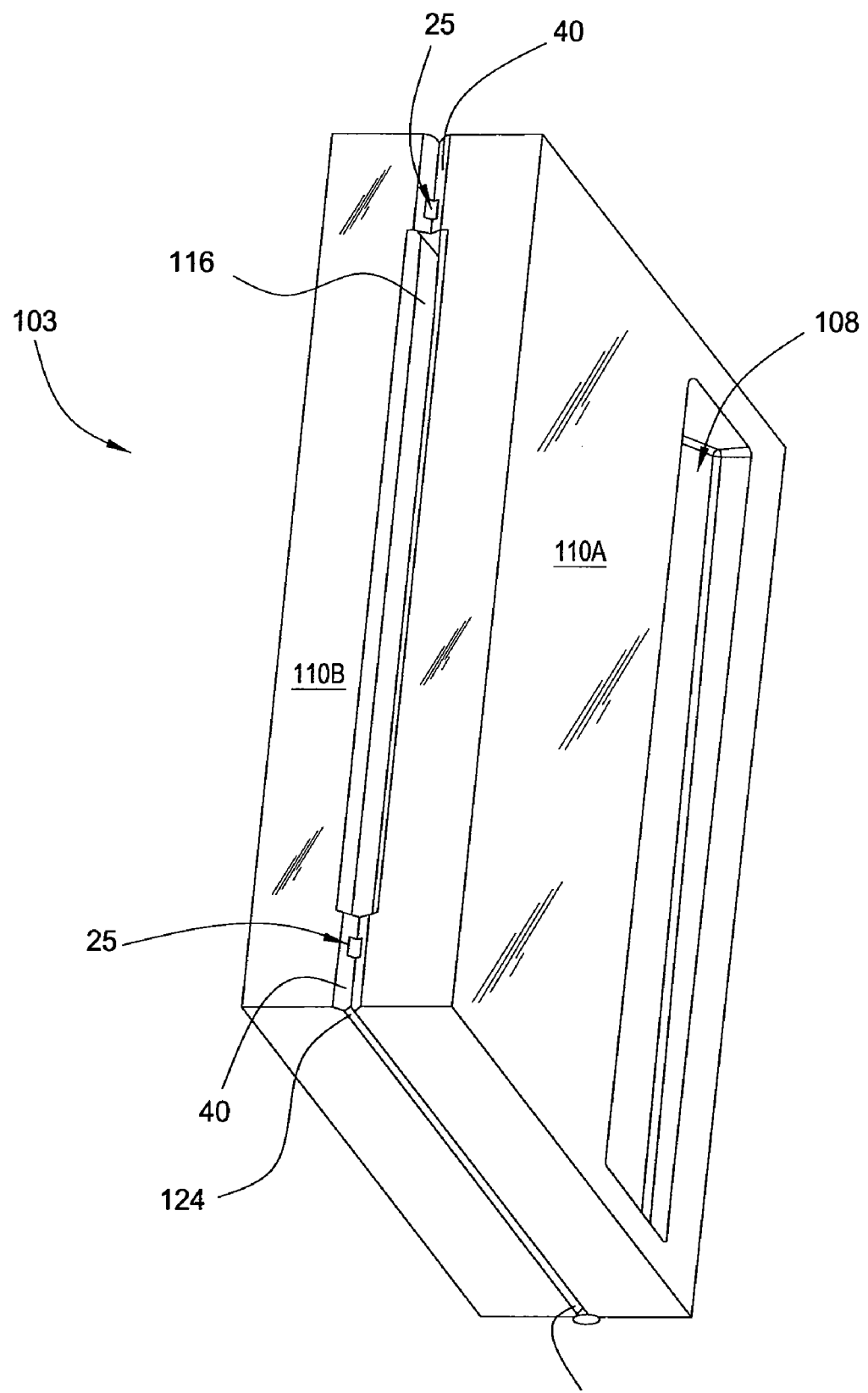
FIG. 4 is an isometric view of one embodiment of a chamber for use in the processing tool of FIG. 3.

FIG. 4 is an isometric view of one embodiment of a chamber 103. Sidewalls 110A, 110B are shown adjacent each other and the aperture 116, adapted to receive a substrate (not shown), is formed therein. In this embodiment, the sidewalls 110A, 110B are made of a polymer material, such as fluoropolymers, for example, polyvinylidine difluoride or polyvinylidene flouride (PVDF). Each sidewall 110A, 110B are to be joined together to form one part of the processing tool 100 shown in FIG. 3. Each sidewall 110A, 110B may be formed by molding, extrusion, machining, or combinations thereof. Channels 25 are shown between the sidewalls 110A, 110B, and a chamfer 40 is shown on an upper surface of the chamber 103. Although hidden from this view, the channels 25 extend from a first end 124 of the chamber 103 to a second end 126 of the chamber 103.

Figure 5:
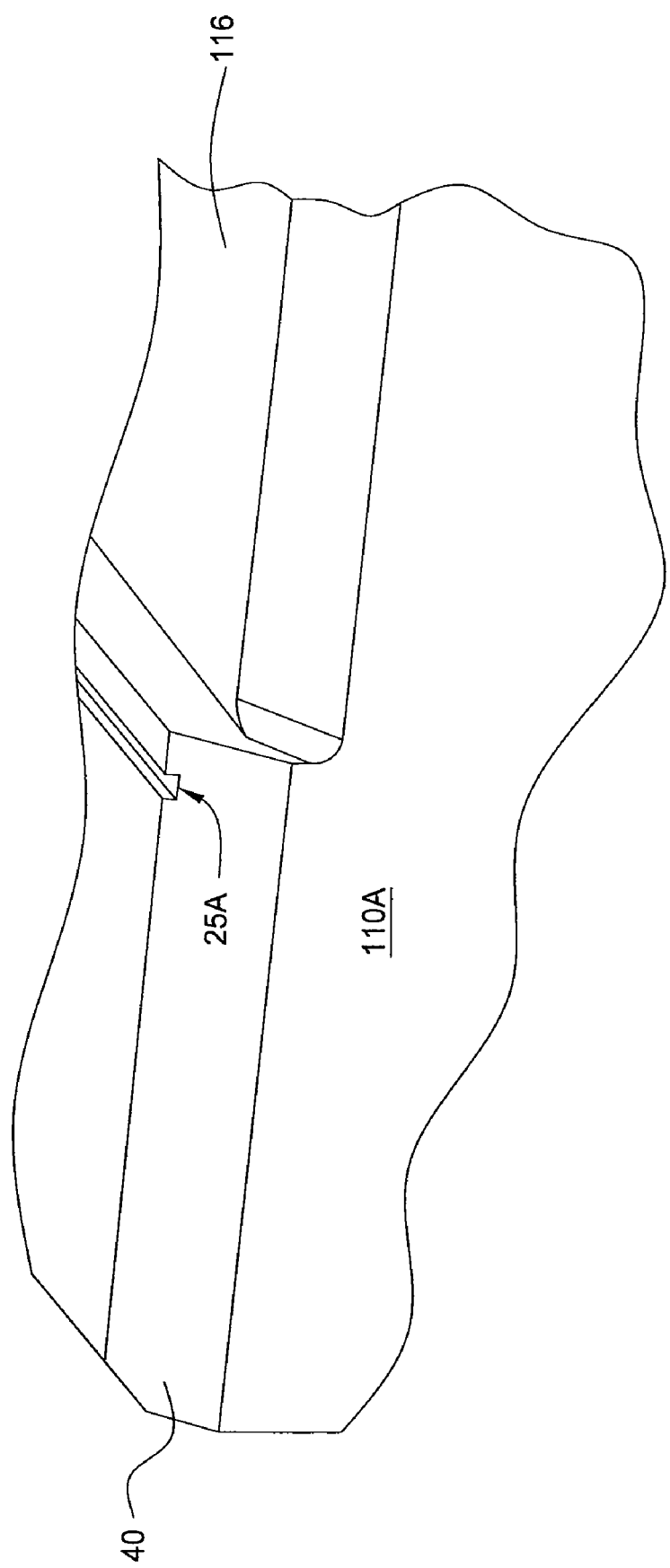
FIG. 5 is an isometric view of a portion of sidewall of the chamber shown in FIG. 4.

FIG. 5 is an isometric view of a portion of sidewall 110A. A groove 25A is shown formed in the sidewall 110A. Sidewall 110B has a corresponding groove adapted to align with groove 25A when the sidewalls are adjacent each other.

An operational joining process as outlined above will now be described in reference to FIGS. 4 and 1C-1D. It is to be noted that the joining process is dependent upon certain variables, which include the size of the conductive member 30 and/or channel 25, the depth of the channel 25 from an exterior surface, the physical properties of the parts, such as thermal conductivity, and thickness of the parts. For example, the depth of the channel 25 may be determined where portions exterior of the channel that form a weldment may be substantially smooth after the joining process, as described in reference to FIG. 2C.

In one embodiment, with reference to FIGS. 4, 5 and 1C-1D, the sidewalls 110A, 110B are joined by inserting a stainless steel wire (as conductive member 30) with a diameter of about 0.031 inches into groove 25A before the sidewalls 110A, 110B are abutted. The groove 25A includes a depth between about 0.012 inches to about 0.018 inches, such as about 0.015 inches. The groove 25A also includes width between about 0.034 inches to about 0.038 inches, such as about 0.035 inches. Sidewall 110B, which includes a groove similar to groove 25A, is brought into contact with sidewall 110A and the sidewalls may be clamped. The wire is adapted to contact a substantial portion of the channel along the length of the wire and extends slightly outside each end 124, 126 of the chamber 103. Washers 45 and connectors 32, 34 are coupled to the wire and 24 VDC (Volt Direct Current) power source and controller are coupled to the connectors 32, 34.

A welding sequence may be initiated in a first time period, which in one embodiment is about 114 seconds. About 12 amps may be applied to the wire during the first welding interval (cycle "on"), which was about 1.5 seconds, and the current was stopped during a second welding interval (cycle "off"), which was about 1.1 seconds. The first welding interval was repeated about 44 times with the second welding interval therebetween to complete the welding sequence in the first time period.

A cooling sequence was then executed during a second time period, which, in one embodiment, is about 720 seconds. The sidewalls 110A, 110B may remain clamped during this second time period to maintain pressure at the interface. The cooling sequence may be any time period required to allow the sidewalls 110A, 110B, and specifically the interface, to cool.

A removal sequence may be initiated after this second time period for a third time period, which, in one embodiment, is about 34 seconds. About 13.5 amps may be applied during a first removal interval (cycle "on"), which may be about 2.0 seconds, and the current was stopped during a second removal interval (cycle "off"), which may be about 0.75 seconds. The first removal interval may repeat about 13 times with the second removal interval therebetween to complete the removal sequence within the third time period.

As the wire heats during the third time period, an actuator in communication with the controller is coupled with the wire. At the end of the third time period, the actuator provides a low force pull pressure to the wire to initiate removal from the weldment. The controller monitors parameters, such as movement detected by one or more sensors coupled thereto. As an initial movement of the wire is detected, such as about 0.75 inches to about 1 inch, an increased pull pressure is provided to the wire, which removes the wire from the interface.

After the wire is removed, the ends of the channels may be closed by a suitable welding and/or filling method, and the chamber 103 may be coupled to the processing tool 100.

This type of weldment can be used in any polymer weld for this type of chamber, or similar product, when line of sight joining is not permitted or preferred. The weldment is free of metals, reducing the likelihood of metal contamination and additional filler material is not required. The method also provides a metal free joint to reduce, or eliminate magnetic sources, and minimize contamination sources, in the product.

While the foregoing is directed to embodiments of the present invention, other and further embodiments of the invention may be devised without departing from the basic scope thereof, and the scope thereof is determined by the claims that follow.

The invention claimed is:

1. A method of manufacturing a processing chamber, which includes a first part and a second part comprising a polymer material, the method comprising:
    forming a first groove along a surface of the first part or a surface of the second part;
    placing a conductive member in the groove;
    aligning the surface of the first part and the surface of the second part;
    securing the surface of the first part adjacent the surface of the second part;
    heating the conductive member for a first period;
    allowing the parts to cool for a second period;
    joining the first part and the second part by heating the conductive member for a third period; and
    removing the conductive member from the parts.

2. The method of claim 1, wherein the second period is greater than the first period and the third period.

3. The method of claim 1, wherein the removing further comprises:
    applying a force to one end of the conductive member after the third period.

4. The method of claim 1, wherein the first groove is formed in the first part, further comprising:
    forming a second groove in the surface of the second part that is aligned with the first groove.

* * * * *

UNITED STATES PATENT AND TRADEMARK OFFICE
CERTIFICATE OF CORRECTION

PATENT NO. : 7,566,850 B2
APPLICATION NO. : 11/460117
DATED : July 28, 2009
INVENTOR(S) : Mimken It is certified that error appears in the above-identified patent and that said Letters Patent is hereby corrected as shown below:

On the Title page:

In the References Cited (56):

Please delete "2005/0191098 A1 9/2005 Ueno et al.";

Please delete "2006/0029411 A1 2/2006 Ishii et al.";

Please delete "JP 10-161445 6/1998";

Please delete "JP 2005-70376 3/2005".

Signed and Sealed this

Twenty-third Day of November, 2010

David J. Kappos
*Director of the United States Patent and Trademark Office*